United States Patent [19]
Hilbert et al.

[11] Patent Number: 5,127,851
[45] Date of Patent: Jul. 7, 1992

[54] MODULAR PATCH PANEL

[75] Inventors: Steven R. Hilbert, Elgin; Michael J. McAndrews, Chicago, both of Ill.

[73] Assignee: Reliance Comm/Tec Corporation, Chicago, Ill.

[21] Appl. No.: 735,426

[22] Filed: Jul. 25, 1991

[51] Int. Cl.⁵ ........................................ H01R 13/627
[52] U.S. Cl. .................................. 439/532; 361/396; 379/328
[58] Field of Search ............ 439/532, 552, 557, 716, 439/715; 361/396, 417, 419, 420, 426, 427, 429; 379/325, 327, 328

[56] References Cited

U.S. PATENT DOCUMENTS

| | | | |
|---|---|---|---|
| 3,535,463 | 10/1970 | Trucco | 379/327 |
| 4,717,358 | 1/1988 | Chaundy | 439/557 |
| 4,811,169 | 3/1989 | Deluca et al. | 361/429 |

OTHER PUBLICATIONS

Reliance COMM/TEC, RMOD-DSX brochure.
Reliance COMM/TEC, "Network Bay Frames For RMOD-DSX Systems Description and Installation," Section RLEC 365-100-003, Issue 1, Feb. 1989.

*Primary Examiner*—Eugene F. Desmond
*Attorney, Agent, or Firm*—Trexler, Bushnell, Giangiorgi & Blackstone, Ltd.

[57] ABSTRACT

A digital signal cross-connect having a relatively high digital signal transmission rate for use with telecommunications transmission networks mountable in an existing network bay frame designed for mounting digital signal cross-connects having substantially lower signal transmission rates comprises a housing having at least a top panel and a bottom panel. A mounting tang is disposed on the top panel, and a mounting notch is located on the bottom panel. The mounting notch is capable of accepting rail tangs of a shelf which in turn mounts to on the network bay frame. The cross-connect is capable of pivotal movement about the rail tangs when the rail tangs are disposed in the mounting notch, and the mounting tang is capable of releasably engaging a rack rail on the shelf.

15 Claims, 5 Drawing Sheets

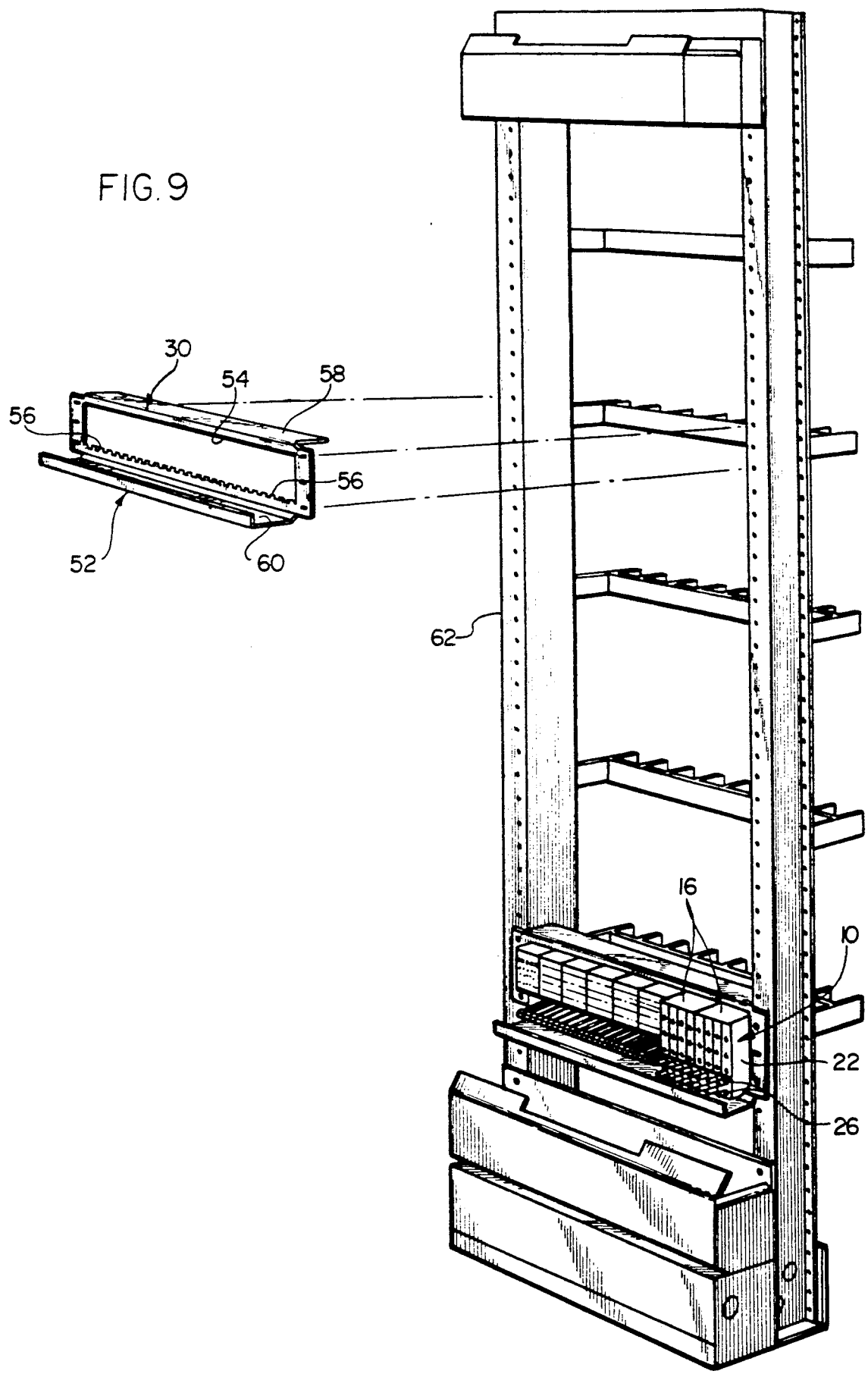

MODULAR PATCH PANEL

BACKGROUND OF THE INVENTION

The present invention generally relates to a unique construction for a digital signal cross connect having relatively high signal transmission rates. More specifically, the invention relates to a unique modular configuration of a digital signal cross connect module having relatively high digital signal transmission rates which allows it to be mounted on a network bay frame commonly used in mounting digital signal cross connects having substantially lower signal transmission rates.

In many modern telecommunications systems, most of the older analog communications signaling equipment has been replaced by corresponding digital equipment. The digital communications signaling equipment is desired because of its greater clarity and speed of transmission.

The digital communications equipment is directly compatible with other modern technologies. For instance, many modern offices utilize facsimile machines for transmitting documents, or other printed matter over telecommunications networks. Many, if not all, facsimile machines utilize digital technology in order to convert the printed images on a document into signals that can be electrically or electronically transmitted from one place to another. Additionally, many places of employment and institutions of higher learning utilize computers having access to other computers, such as through a DEC-NET TM network, or to large databases, such as MEDICUS TM and WESTLAW TM. The computers and their connecting modems themselves are completely digital in construction and operation, and the access they have to the other computers and databases is made over a telecommunications network. Therefore, it is highly desirable to have a telecommunications network that is also based on digital technology.

By using a digital telecommunications network in conjunction with other digital equipment, such as computers, the operation of the digital equipment becomes more precise, accurate, and has greater celerity. The digital telecommunications lines, switches, and other equipment allow for greater transmission clarity and faster transmission speeds than their older analog counterparts. The benefits of digital telecommunications technology is enjoyed not only by businesses having computers and facsimile machines, but by every user of the digital telecommunications network. Human voices are usually clearer when transmitted through digital equipment. Often the voices are so clear that the person on the other end of the line sounds as though he is in the same room.

However, digital equipment, especially in the computer field, is quickly advancing. New innovations in digital technology occur almost daily. Accordingly, digital telecommunications systems must keep up with that rapid pace of advancement. Additionally, as more and more users are added to a telecommunications network, the equipment must become capable of operations at greater and greater speeds in order to keep up with the enhanced workload. Thus, digital telecommunications equipment that was state-of-the-art today may become obsolete tomorrow.

A consequential effect of the rapid advancement of digital technology is that certain digital equipment must be replaced from time to time to allow for newer, faster, more advanced equipment. This is especially true in switching and connecting equipment. For instance, a digital signal cross-connect having a transmission rate of 1.54 megabytes per second (Mb/s) might have to be replaced by a digital signal cross-connect having a transmission rate of approximately 45 Mb/s or even approximately 274 Mb/s. Often, the second digital signal cross-connect is incompatible with the other existing telecommunications equipment and/or its supporting superstructure. Thus, in order to utilize the faster transmission rates of the second digital signal cross-connect, the older cross-connect would have to be removed along with its supporting superstructure.

This constant replacement process has become cost prohibitive due to the waste of the superstructure and the intensity of labor involved. The cost prohibiting factors are again encountered if a 45 Mb/s cross-connect must be replaced by a digital signal cross-connect having a transmission rate of approximately 274 megabytes per second. The time needed to replace the equipment represented lost revenues to the telecommunications firms because the communications network, or a portion thereof, would be down for a certain time period. Also, because the entire superstructure had to be replaced, the number of customers inconvenienced by the equipment upgrade was substantial, leading to greater lost revenues. In order to keep the costs of equipment replacement as low as possible, the present invention provides a uniquely constructed digital signal cross-connect device which is compatible with an existing digital cross-connect superstructure. The uniquely constructed digital signal cross-connect fits directly into the apertures and spaces which were designed to accept older and slower digital equipment. Specifically, the digital cross-connect of the present invention has an external mounting configuration or "footprint" which allows it to be mounted in the rack space designed for, or previously occupied by older equipment and in substantially the same fashion as the older equipment. With the use of the digital signal cross-connect, constructed according to the teachings of the present invention, newer, faster digital equipment can be installed either together with existing equipment or as a replacement of older equipment without having to remove or re-configure the existing telecommunications superstructure, thereby reducing down time and lost revenues.

OBJECTS AND SUMMARY OF THE INVENTION

A general object of the present invention is to provide a relatively high transmission rate digital signal cross-connect capable of being mounted on an existing network bay frame constructed to mount relatively low transmission rate cross-connects thereon.

A more specific object of the invention is to provide a relatively high transmission rate digital signal cross-connect having an external mounting configuration substantially similar to a corresponding external mounting configuration of a relatively low transmission rate cross-connect.

Another object of the present invention is to provide a relatively high transmission rate digital signal cross-connect mountable on a rack upon which relatively low transmission rate cross-connects are also mounted.

Another object of the invention is to provide a relatively high transmission rate digital signal cross-connect having a modular design.

A further object of the present invention is to provide a relatively high transmission rate digital signal cross-connect having a construction that helps to reduce the amount of system downtime needed to replace equipment.

A digital signal cross-connect, constructed according to the teachings of the present invention, having a relatively high digital signal transmission rate for use with telecommunications transmission networks mountable in an existing network bay rack designed for mounting digital signal cross-connects having substantially lower signal transmission rates comprises a housing having at least a top panel and a bottom panel. A mounting tang is disposed on the top panel, and a mounting notch is located on the bottom panel. The mounting notch is capable of accepting rail tangs on the network bay rack. The cross-connect is pivotally movable about the rail tangs when the rail tangs are disposed in the mounting notch, and the mounting tang is capable of releasably engaging a rack rail on the network bay rack.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in which like reference numerals identify like elements, and in which:

FIG. 9 is a perspective view of a network bay frame having shelves mounted thereon which may in turn have various cross-connects mounted showing the installation of a shelf onto rack;

DETAILED DESCRIPTION OF THE ILLUSTRATED EMBODIMENT

Figure 1:
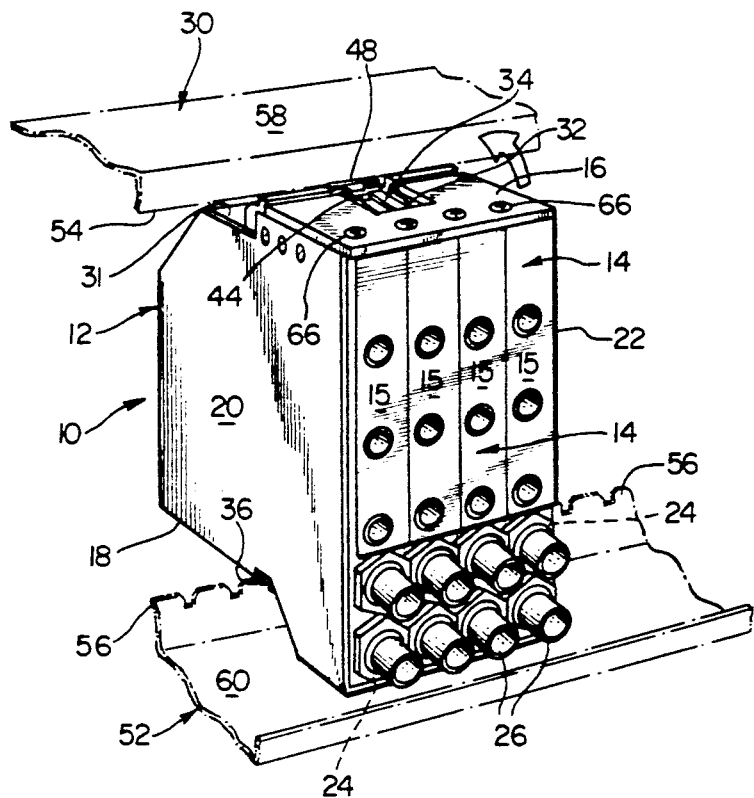
FIG. 1 is a frontal perspective view of a relatively high transmission rate digital cross-connect, constructed according to the teachings of the present invention, mounted on a shelf or tray.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to what is illustrated and described herein.

Referring initially to FIG. 1, a relatively high transmission rate digital signal cross-connect 10 is shown. The cross-connect 10 is in the form of a modular unit which can be easily inserted into an existing rack or shelf on a network bay frame 62 in order to replace existing equipment, or to expand existing telecommunications capacity. The cross-connect 10 houses equipment necessary for the proper monitoring and transmission of digital telecommunications signals between respective transmission cables to be interconnected thereat. This modular unit is constructed so as to be insertable into a space on a rack of an existing network bay frame 62 currently occupied by digital signal cross-connects having a relatively substantially lower signal transmission rate. This sort of modular construction gives an operator of a telecommunications network great flexibility in repairing and upgrading the network. It is to be noted that this modular construction allows the cross-connect to be mounted substantially similarly to the front cross-connect/8 termination modular DSX unit sold by Reliable Electric under the name RMOD-DSX 1.

Figure 2:
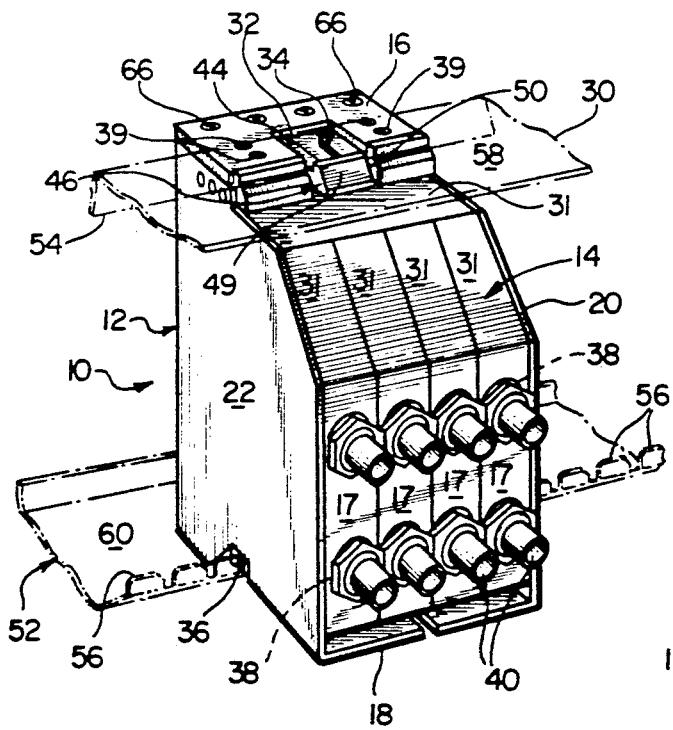
FIG. 2 is a rear perspective view of the digital signal cross-connect of FIG. 1 further showing the construction of the mounting means.

As clearly shown in FIG. 1 and FIG. 2, the cross-connect 10 is comprised of a housing 12 having a plurality of panels, including a top panel 16, a bottom panel 18, a first side panel 20, and a second side panel 22. All of the panels 16 through 22 are substantially smooth and planar, and may be composed of any firm, strong material, but preferably of metal.

Figure 7:
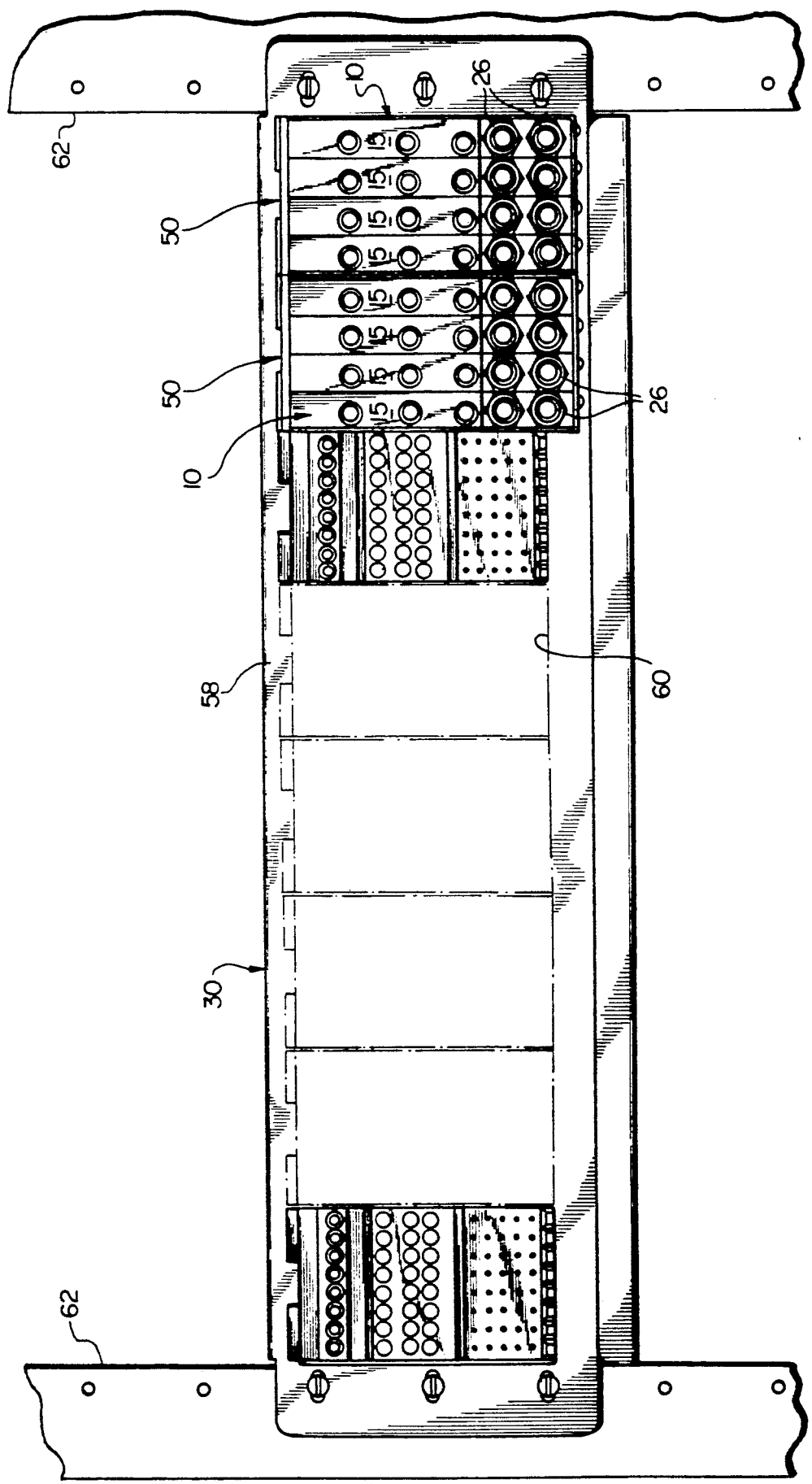
FIG. 7 is a reduced perspective view of a network bay frame shelf upon which are mounted digital signal cross-connects having relatively slower transmission rates and digital signal cross-connects of the present invention having substantially faster transmission rates.
Figure 8:
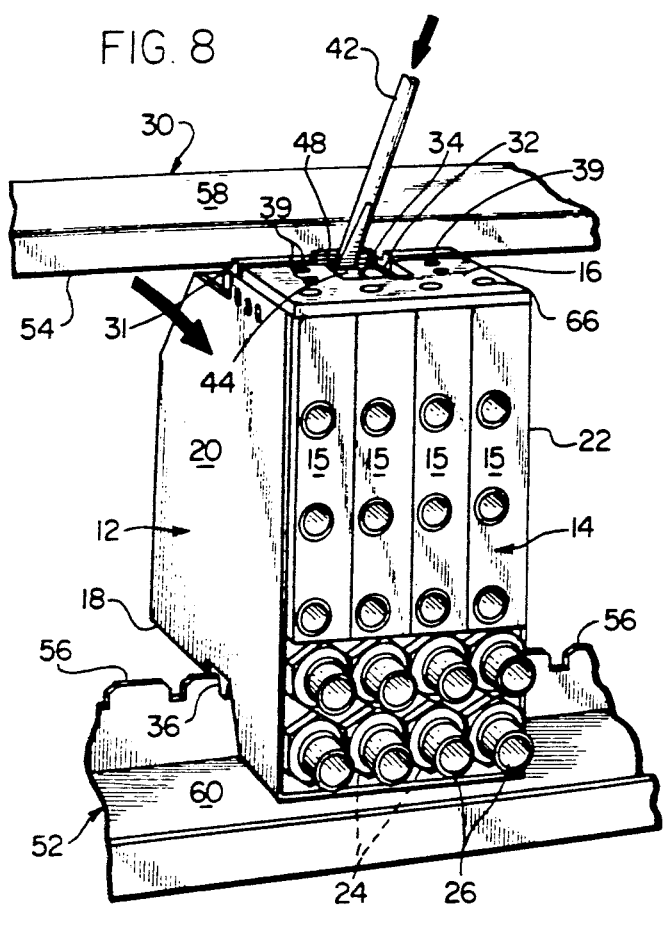
FIG. 8 is a perspective view illustrating part of the process of removing the cross-connect of FIG. 1 from a shelf of a network bay frame.

The housing 12 accepts or mounts one or more modules 14 (up to a total of four in the illustrated embodiment). Each module 14 has a face panel 15 which is substantially planar and vertical in nature. The face panel 15 is designed to jut out into an aisle adjacent to which the network bay frame 62 is located in order to provide easy access thereto, as shown in FIG. 7. The face panel 15 has a plurality of apertures 24 therein. As shown in FIG. 1 and FIG. 8, these apertures 24 contain receptacles 26 for receiving coaxial cable connectors. The receptacles 26 may be internally wired as monitoring contacts which are used to monitor the cross-connections for transmission clarity, for instance, or as in (IN) and out (O) connectors for cross-connecting or patching incoming and outgoing coaxial connector-equipped cables.

The cable connectors 28 can take on a variety of forms, however, it is preferred that they be of a construction commonly referred to as a BNC connector. This type of cable connector 28 is capable of sufficiently shielding the connections between a signal bearing cable and the cross-connect 10 so as to minimize the phenomenon of cross talk, which occurs when the signals traveling along one cable or contact induce duplicate signals in an adjacent cable or contact. Thus, the cable connectors 28 comprise means for reducing cross-talk. This is especially desired in digital signal transmissions due to the high transmission rates and the desire for greater clarity.

The face panels 15 are bounded by the top panel 16, the bottom panel 18, the first side panel 20 and the second side panel 22. The top panel 16 and the bottom panel 18 define opposite boundaries of the face panels 15, and the first and second side panels 20 and 22, respectively, define opposite boundaries of the face panels 15 substantially perpendicular to the boundaries defined by the top and side panels 16 and 18.

The first and second side panels 20 and 22 extend substantially perpendicularly rearward from the face panels 15 at opposite ends thereof. The first and second side panels 20 and 22 extend rearward to respective rear panels 17 of the modules 14 along corresponding sides of both. The first and second side panels 20 and 22 are substantially planar and smooth, in order to allow for easy slidable movement of the cross-connect 10 into and out of a rack 30, shown in FIG. 7, on a network bay frame 62, shown in FIG. 9. The smoothness of the first and second side panels 20 and 22 also allow for uninhibited side-by-side disposition of the cross-connects 10 on a rack 30, as shown in FIG. 7, in order to maximize available space thereon.

The top panel 16 is horizontal and extends substantially perpendicularly rearward away from the face panels 15 along a top portion thereof opposite to the bottom panel 18. The top panel 16 abuts the rear panels 17 and the face panels 15 along corresponding top edges of both, and connects the first side panel 20 with the second side panel 22 also along corresponding top edges thereof.

Figure 3:
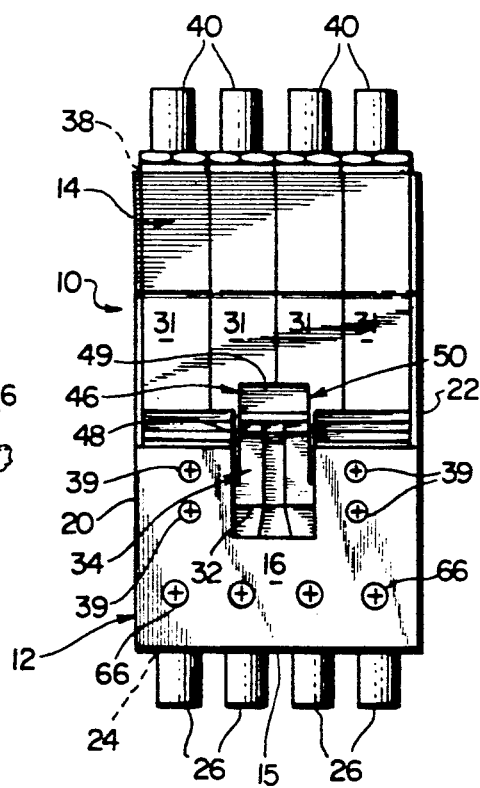
FIG. 3 is a top plan view of the digital signal cross-connect of FIG. 2 showing the construction of a mounting tang or tongue.
Figure 5:
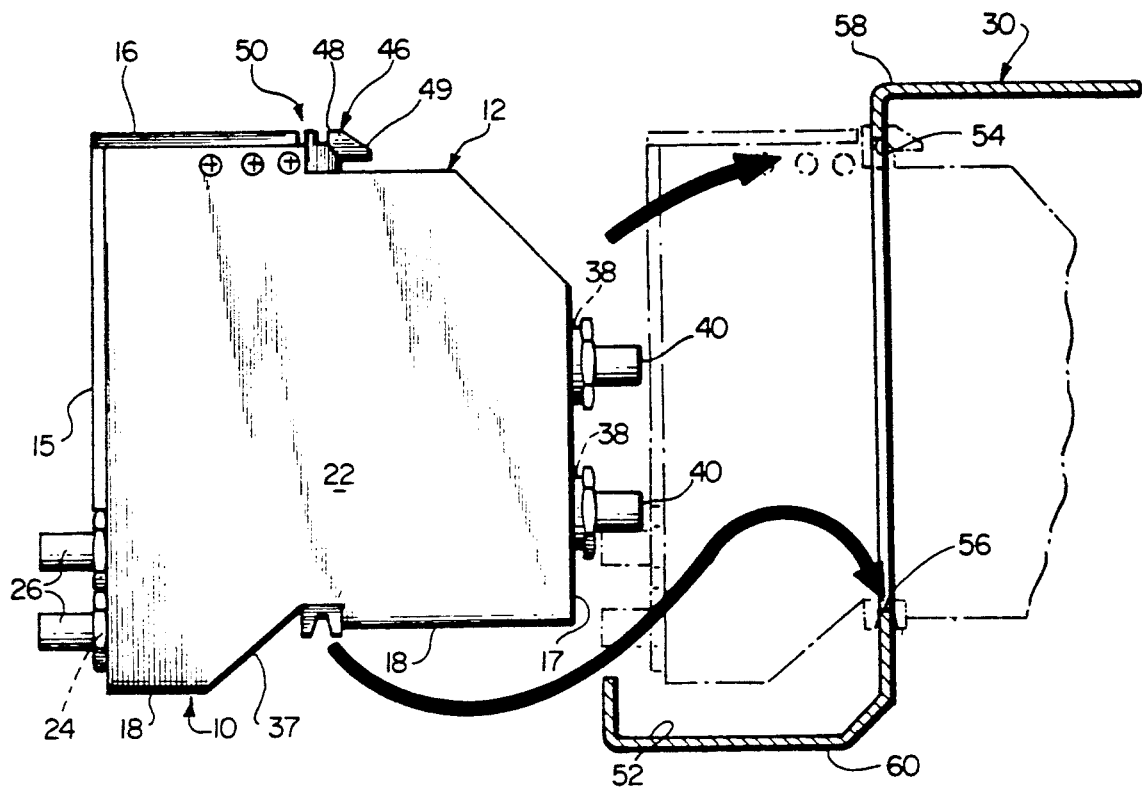
FIG. 5 is a sectional view of the cross-connect as the cross-connect is inserted into a shelf or tray.

However, as shown in FIG. 3 and FIG. 5, as the top panel 16 extends further rearwardly towards the rear panels 17, the top panel 16 departs from its substantially flat nature. Specifically, a recess 32 containing a tang or tongue 34 is disposed on the top panel 16 approximately centered midway between the first side panel 20 and the second side panel 22. The construction and function of the recess 32 and the tang or tongue 34 will be discussed fully hereinafter. The recess 32 and the tongue 34 do not extend through the entire front-to-rear length of the top panel 16.

It is to be noted that the tang or tongue 34 can be provided as a separate piece attached to the top panel 16 by means of fasteners 39. The piece bearing the tongue 34 can be molded from plastic, for example, or formed of another suitable material which can provide the tongue 34 with the desired characteristics, as will be described herein.

Between the point of termination of the recess 32 and the tongue 34 opposite to the face panels 15, the top panel 16 terminates. Accordingly, the top panel 16 does not extend the entire length of the side panels 20 and 22. However, top portions 31 of the modules 14 occupy the remainder of the cross-connect 10 which is not occupied by the top panel 16, as shown in FIG. 2 and FIG. 3.

Figure 4:
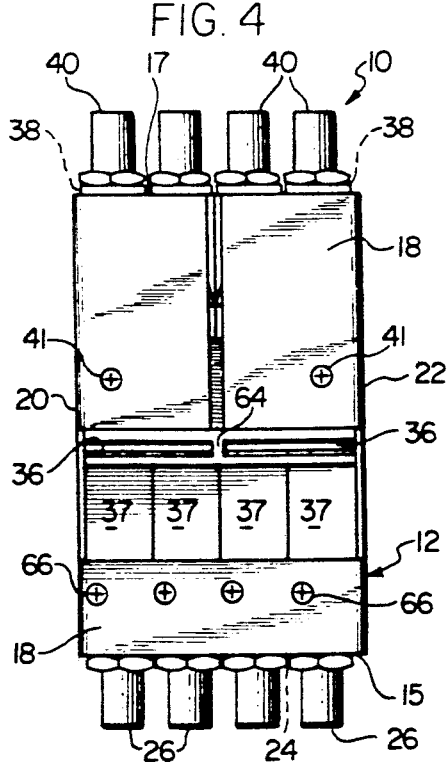
FIG. 4 is a bottom view of the digital signal cross-connect of FIG. 3 showing the construction of a mounting notch.

The bottom panel 18 is also constructed with the same objectives in mind as with the top panel 16. Specifically, as shown in FIG. 4, the bottom panel 18 abuts a bottom edge of the face panels 15 opposite to the edge thereof abutted by the top panel 16. The bottom panel 18 is substantially horizontal and extends rearward substantially perpendicularly to the face panels 15 towards the rear panels 17. The bottom panel 18 abuts the face panels 15 and the rear panels 17 along corresponding bottom edges of both.

However, as shown in FIG. 4 and FIG. 5, as the bottom panel 18 extends further rearwardly towards the rear panels 17, the bottom panel 18 terminates for a certain distance before it begins its substantially flat, horizontal nature again, extending to the rear panels 17. Specifically, after a certain distance of extension determined by the configuration of the rack 30, the bottom panel 18 terminates leaving a gap. The gap extends upwardly in a sloping fashion towards the rear panels 17. The particular angle of that slope is determined by the configuration of the rack 30.

After sloping upwardly for a certain length, again determined by the rack 30, the space terminates and the bottom panel 18 resumes its substantially flat, horizontal nature. At this point, a mounting notch 36 is disposed across the bottom panel 18 extending from the first side panel 20 to the second side panel 22. The space is filled by the bottom panels 37 of the modules 14 when they are properly inserted into the housing 12.

The precise structure and function of the mounting notch 36 will become more clear herein. It is to be noted, however, that the mounting notch 36 can be provided as part of a piece separate from the housing 12 which can be mounted thereto by means of fasteners 41. The piece may be molded from plastic, or can be constructed of another suitable material by another method to give the mounting notch 36 its desired characteristics, as will be discussed hereinafter.

Because the modules slope downwards and the bottom panel 18 slopes upwards, the rear panels 17 are substantially shorter than the face panels 15. Again, this structure is such as to mount the commonly used rack 30. Opposing top and bottom edges of the rear panels 17 are bounded by the module 14 and the bottom panel 18 respectively, as shown in FIG. 2 and FIG. 5. Opposing side edges of the rear panels 17 are bounded by the first and second side panels 20 and 22 respectively. The rear panels 17 are substantially vertical and planar in nature, and are substantially mutually perpendicular to the top panel 16, the bottom panel 18, and the first and second side panels 20 and 22.

The rear panels 17 are substantially parallel to the face panels 15. The rear panels 17 have a plurality of apertures 38 therein substantially similar to the through apertures 24 in the face panels 15. The apertures 38 mount coaxial cable connectors or sockets 40 to connect cables to the cross-connect 10. The cable connectors 40 are also, preferably, of the BNC type. The digital signal cross-connect 10 as described is suitable for interconnecting digital telecommunications equipment having relatively high transmission rates, useful in transmitting digital telecommunications or other signals.

Returning to the recess 32 and the tongue 34, the precise structure thereof will now be described. The recess 32 extends downwardly from a horizontal plane defined by the top panel 16 towards an interior of the housing 12. As shown in FIG. 8, the recess 32 is of sufficient size to accept a tool 42, such as a screwdriver and the like, useful in depressing the tongue 32 to release the housing 12 from the rack 30.

Proximate to the bottom of the recess 32, as shown in FIG. 3, the tongue 34 is disposed. The tongue 34 is composed of a flexible support member 44 and a locking member or head 46. One end of the support member 44 is attached to and extends from an interior wall of the recess 32 with an opposite end of the support member 44 terminating at the head 46. The head 46 projects upwardly substantially perpendicularly away from the support member 44 to form a mounting tang 48. The support member 44 is preferably composed of a firmly flexible, resilient material so that the head 46 can be shifted between a locking and an unlocking position, as will be discussed herein. To facilitate the shifting of the head 46 into the locking position, the head 46 has an inclined face 49.

The mounting notch 36, along with the tongue 34 and the recess 32, form housing mounting means 50 which mount the cross-connect 10 onto a shelf or rack 30 on a network bay frame 62, shown in FIG. 9. The rack 30, in pertinent part shown in FIG. 5 and FIG. 9, is composed of a tray 52 having a rack rail 54 and rack tangs 56. The rack rail 54 and the rack tangs 56 extend along the entire length of the rack 30. The rack rail 54 extends downwardly from a top portion 58 of the rack 30, while the rack tangs 56 extend upwardly from a bottom portion 60 of the rack 30. The rack 30 is selectively mountable in any of a plurality of positions on a network bay frame 62 so that the frame 62 can bear a plurality of racks 30 and therefore a plurality of cross-connects 10.

As stated above, the cross-connect 10 is constructed so as to be insertable into the rack 30. Also, the precise external configuration of the cross-connect housing 12, defined by the panels 16 through 22, is constructed to be insertable in the rack 30. The cross-connect housing 12 provides means for firmly holding itself within the rack 30. The cross-connect housing 12 is mounted upon the rack 30 by means of the mating of the housing mounting means 50 with corresponding complementary mounting means, in the form of the rack rail 54 and the rack tangs 56, on the rack 30.

Accordingly, the mounting notch 36 is constructed so as to accept the rack tangs 56 when the cross-connect 10 is properly positioned in the rack 30. The mounting notch 36 has a width somewhat larger than a corresponding width of the rack tangs 56. This allows the cross-connect 10 to pivot about the rack tangs 56. It is to be noted that the mounting notch need not be continuous across the bottom panel 18. Indeed, the mounting notch 36 may be separated into a plurality of mounting notches 36 by a septum 64. Also, the head 46 of the tongue 34 is constructed so as to apply a compressive force to the rack rail 54.

Figure 10:
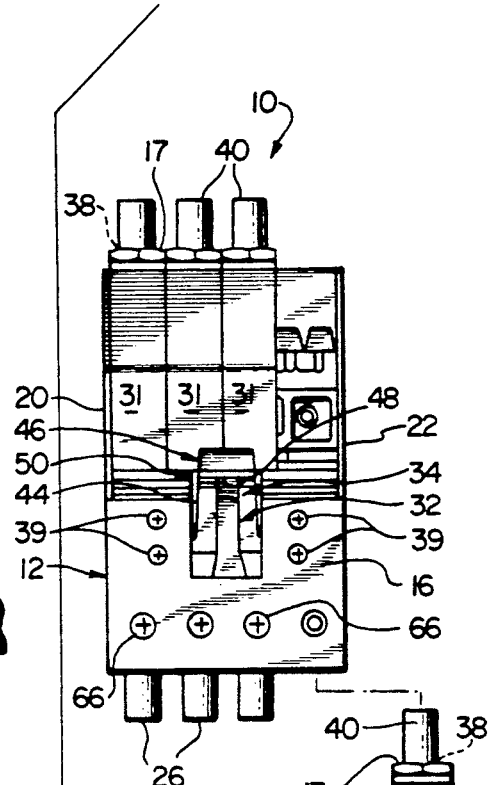
FIG. 10 is a top view of a cross-connect showing the unique modular construction thereof.
Figure 11:
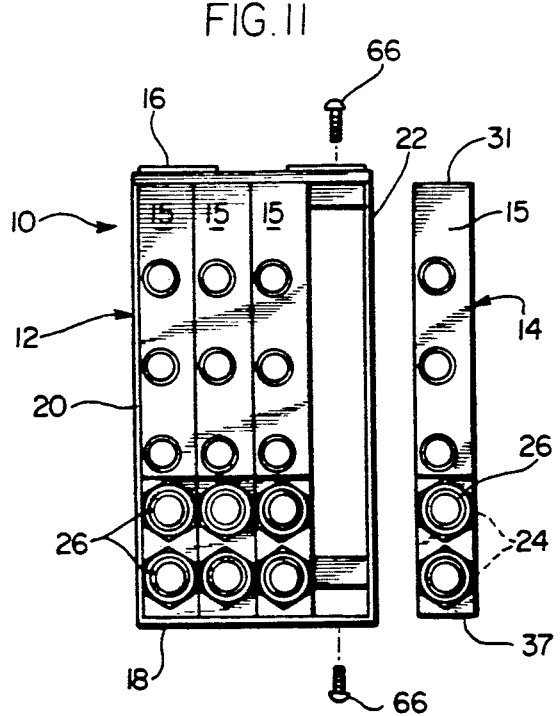
FIG. 11 is a frontal view of the cross-connect of FIG. 10 further showing the modular construction thereof.

As previously mentioned, the housing 12 is capable of retaining a plurality of cross-connect modules or elements 14, as shown in FIG. 10 and FIG. 11. The cross-connect elements 14 interconnect digital telecommunications equipment, useful in transmitting and receiving digital data signals. The cross-connect elements 14 may take on a number of constructions as long as their external configuration is insertable into the housing 12. In a preferred embodiment, the housing is capable of accepting four such elements 14, however, greater or lesser numbers are possible, without departing from the invention.

After insertion of the elements 14 into the housing 12, the cross-connect elements 14 are held firmly in place within the housing 12 by element mounting means 66 in the form of a screw or other suitable fastener. The modular construction of the cross-connect 10 gives a telecommunications system operator great flexibility regarding capacity and switching speed. With cross-connects 10, constructed according to the teachings of the present invention, an operator may not have to replace the housing 11 at all in order to change or replace digital cross-connect equipment. The operator may simply replace or remove a single element or module 14 at a time, as required, resulting in decreased down time and reduced revenue loss.

Further aspects of the unique function of the above-described digital signal cross-connect 10 will become apparent in the following paragraphs. When equipment upgrades occur in a telecommunications network, the amount of time needed to implement the upgrade is substantially smaller with the use of the present invention. First, a workman must remove the old equipment, leaving an empty space on the rack 30 defined precisely by the dimensions of the old equipment. Because the cross-connect 10 is constructed so as to occupy that same, specifically dimensionally defined space, all the workman need do is to mount the new cross-connect 10, having a substantially higher digital signal transmission rate, upon the rack 30.

Figure 6:
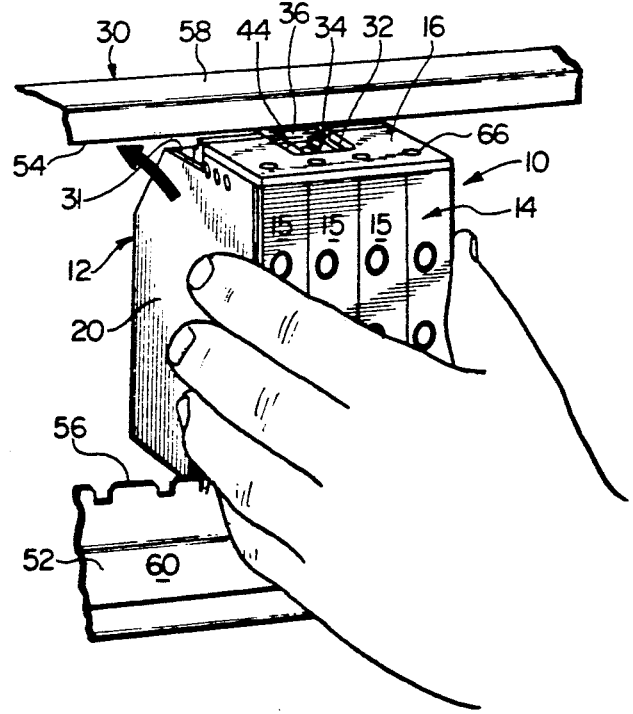
FIG. 6 is a perspective view illustrating part of the process of mounting the cross-connect of FIG. 1 on a shelf of a network bay frame used for mounting cross-connects having substantially slower transmission rates, showing the insertion of rack tangs into a mounting notch of the cross connect.

In order to mount a cross-connect 10 on a rack 30, the workman must first position the cross-connect 10 within the empty space so that the rack tangs 56 are within the mounting notch 36 on the bottom panel 18 of the cross-connect 10. Because the width of the mounting notch 36 is larger than a corresponding width of the rack tangs 56, the cross-connect 10 is free to pivot about the rack tangs 56, as shown in FIG. 6.

At this point, the workman pivots the cross-connect upwards about the rack tangs 56 so that the inclined face 49 of the mounting tang 48 engages the rack rail 54. As the workman applies a progressively higher magnitude pivotal force, the rack rail 54 moves progressively along the inclined face 49, due to the fact that the pivoting of the cross-connect 10 causes a downwardly directed force to be applied to the inclined face 49, and therefore to the head 46. This causes the tongue 34 to be depressed into the recess 32 so that the mounting tang 48 can move downwards and behind the rack rail 54. Once this has been done, the tongue 34, due to the resiliency in the material composing it, returns towards its rest position, thereby bringing the mounting tang 48 and the head 46 upwards and into the locking position. The housing mounting means 50 thereby forms a releasable snap-in type frictioned interference mount of the cross-connect 10 upon the rack 30. The cross-connect 10 is now firmly and releasably mounted to the rack 30, as shown in FIG. 7. The cross-connect 10 can be placed on a rack 30 with others of its kind, or it can be mixed with other cross-connects having lower transmission rates and different constructions on the same rack 30, or indeed with other rack-mounted equipment.

To release the cross-connect 10 from the rack 30 for repair or replacement, the workman must shift the head 46 and the mounting tang 48 into the unlocking position. To do this, as shown in FIG. 8, the workman may use a tool 42, such as a screwdriver or the like. The workman places a tip of the tool 42 against the tongue 34 in close proximity to the rack rail 54 and the head 46. The workman then applies a substantially downwardly directed force to the tool 42, thereby forcing the tongue 34 to move downwards into the recess 32. This brings the mounting tang 48 out of contact with the rack rail 54. Simultaneously, the workman pivots the cross-connect 10 forward about the rack tangs 56 to free the cross-connect 10. Now, the workman can replace the cross-connect 10 or service the cables connected to the cable connectors 40 on the rear panel 14.

It is to be further noted that the configuration of the housing 12 and the positioning of the mounting means 50 (i.e. the positioning of the tang 48 and the notch 36 on the housing 12) relative to the housing 12 defines a spacing or relative orientation of the mounting means 50 which complements the orientation or spacing of the mounting elements of the rack 30. In this way, the mounting means 50 is capable of releasably engaging the complementary mounting means on the shelf or rack 30.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A digital signal cross-connect having a relatively high digital signal transmission rate for use with telecommunications transmission networks and mountable in a shelf which is in turn mountable to an existing network bay frame designed for mounting digital signal cross-connects having substantially lower signal transmission rates, comprising: a housing having at least a top panel and a bottom panel; a mounting tang disposed on the top panel; a mounting notch located on the bottom panel; said mounting notch being capable of accepting at least one rail tang on the shelf; the cross-connect being pivotally movable about the rail tang when the rail tang is disposed in the mounting notch; and the mounting tang being capable of releasably engaging a rack rail on the shelf.

2. A digital signal cross-connect as defined in claim 1 wherein the mounting tang is shiftable between a locking position and an unlocking position relative to the rack rail.

3. A digital signal cross-connect as defined in claim 1 further comprising a recess disposed on the top panel, a resiliently bendable support member having a head disposed adjacent the recess, the support member being resiliently shiftable within the recess between a locking position and an unlocking position, and the mounting tang being disposed on the head.

4. A digital signal cross-connect as defined in claim 1 wherein the mounting notch has a width substantially larger than a corresponding width of the rail tang.

5. A digital signal cross-connect as defined in claim 1 further comprising a cross-connect module mountable to the housing; the housing being configured for selectively mounting a plurality of similar cross-connect modules.

6. A digital signal cross-connect as defined in claim 5 wherein the cross-connect module has a plurality of BNC-type connectors for receiving and cross-connecting incoming and outgoing data transmission lines.

7. A digital signal cross-connect as defined in claim 6 wherein the cross-connect module has a plurality of coaxial connector-receiving jacks for selectively cross-connecting, patching, and monitoring the incoming and outgoing data transmission lines.

8. A digital signal cross-connect as defined in claim 2 wherein the mounting tang has an inclined face engagable with a rack rail to facilitate shifting between the locking and the unlocking positions for interengagement therebetween.

9. A digital signal cross-connect as defined in claim 1 wherein the mounting notch is divided into a plurality of mounting notches by a septum.

10. A digital signal cross-connect having a relatively high digital signal transmission rate for use with telecommunications transmission networks mountable in an existing network bay frame designed for mounting digital signal cross-connects having substantially lower signal transmission rates, comprising: a housing having housing mounting means; a first part of the housing mounting means being shiftable between a locking position and an unlocking position; the first part of the housing mounting means being releasably matable with a corresponding first mounting means disposed on the network bay frame; and a second part of the housing mounting means being engagable with a corresponding second mounting means disposed on the network bay frame for allowing pivotal motion of the housing into a position for mating the first part of the housing mounting means.

11. A digital signal cross-connect as defined in claim 10 wherein the first part of the housing mounting means comprises a mounting tang, and the second part of the housing mounting means comprises a mounting notch.

12. A digital signal cross-connect as defined in claim 10 wherein the housing mounting means provides a releasable snap-in mount between the housing and the corresponding first and second mounting means on the network bay frame.

13. A digital signal cross-connect as defined in claim 10 wherein a plurality of cross-connect elements are mountable within the housing.

14. A digital signal cross-connect as defined in claim 13 further comprising element mounting means capable of retaining the plurality of cross-connect elements within the housing.

15. A digital signal cross-connect having a relatively high digital signal transmission rate for use with telecommunications transmission networks and mountable in a shelf which is in turn mountable to an existing network bay frame designed for mounting digital signal cross-connects having substantially lower signal transmission rates, comprising: a housing having at least a top panel and a bottom panel; mounting means disposed on the housing for engagement with complementary mounting means of the shelf located at predetermined relatively spaced orientations; and the mounting means being capable of releasably engaging the complementary mounting means on the shelf.

* * * * *